US010234158B2

(12) United States Patent
Laughman et al.

(10) Patent No.: US 10,234,158 B2
(45) Date of Patent: Mar. 19, 2019

(54) COORDINATED OPERATION OF MULTIPLE SPACE-CONDITIONING SYSTEMS

(71) Applicant: Mitsubishi Electric Research Laboratories, Inc., Cambridge, MA (US)

(72) Inventors: Christopher R. Laughman, Waltham, MA (US); Hongtao Qiao, Cambridge, MA (US); Daniel Burns, Wakefield, MA (US); Scott A Bortoff, Brookline, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 204 days.

(21) Appl. No.: 15/450,260

(22) Filed: Mar. 6, 2017

(65) Prior Publication Data
US 2018/0252425 A1   Sep. 6, 2018

(51) Int. Cl.
F24F 11/62     (2018.01)
F24F 11/64     (2018.01)
(Continued)

(52) U.S. Cl.
CPC ............ F24F 11/30 (2018.01); F24F 11/62 (2018.01); F24F 11/77 (2018.01); F24F 11/83 (2018.01);
(Continued)

(58) Field of Classification Search
CPC ......... G05B 19/0426; G05B 2219/2614; F24F 11/30; F24F 11/85; F24F 11/64;
(Continued)

(56) References Cited

U.S. PATENT DOCUMENTS 6,553,778 B2 * 4/2003 Tipton .................. F25B 39/02
                                                    62/196.1
2004/0065095 A1 * 4/2004 Osborne .................. F24F 3/00
                                                    62/160
(Continued)

FOREIGN PATENT DOCUMENTS

EP     1698833 A2    9/2006
EP     3098541 A1   11/2016
WO  2016025739 A1    2/2016

Primary Examiner — Thomas C Lee
Assistant Examiner — Anzuman Sharmin
(74) Attorney, Agent, or Firm — Gene Vinokur; James McAleenan; Hironori Tsukamoto

(57) ABSTRACT

A controller controls a first air-conditioning system and a second air-conditioning system having separate refrigerant circuits, but arranged for conditioning a common space. The controller includes a multi-variable regulator to determine control signals for controlling operations of first components of the first and the second refrigerant circuits to reduce jointly and concurrently an environmental error between setpoint and measured values of environment in the common space. The controller also includes at least two single-variable regulators to receive operational errors between setpoint and measured values of an operation of a second component of the first and the second refrigerant circuits. The controller separately determines control signals for controlling the operation of different refrigerant circuits that reduce the operational errors. The controller also includes a lookup table that stores values for other inputs of the systems that improve its performance, and which selects specific input values for both systems according to the outputs of the multi-variable and/or single variable regulators. The controller includes an electrical circuit for controlling the first and the second air-conditioning systems according to the determined control signals.

19 Claims, 11 Drawing Sheets

(51) Int. Cl.
    *F24F 11/77* (2018.01)
    *F24F 11/85* (2018.01)
    *F25B 49/02* (2006.01)
    *F24F 110/10* (2018.01)
    *F24F 110/20* (2018.01)
    *F24F 140/20* (2018.01)
    *G05B 19/042* (2006.01)
    *F24F 11/30* (2018.01)
    *F24F 11/46* (2018.01)
    *F24F 11/83* (2018.01)
    *F24F 11/84* (2018.01)

(52) U.S. Cl.
    CPC ........ F25B 49/022 (2013.01); G05B 19/0426 (2013.01); *F24F 11/46* (2018.01); *F24F 11/64* (2018.01); *F24F 11/84* (2018.01); *F24F 11/85* (2018.01); *F24F 2110/10* (2018.01); *F24F 2110/20* (2018.01); *F24F 2140/20* (2018.01); *F24F 2203/02* (2013.01); *F25B 2313/0293* (2013.01); *F25B 2313/0294* (2013.01); *G05B 2219/2614* (2013.01)

(58) Field of Classification Search
    CPC ............ F25B 49/022; F25B 2313/0293; F25B 2313/0294; F25B 2700/171; F25B 2600/2513; F25B 2600/112; F25B 2700/02; F25B 2700/2104; F25B 2600/025; F25B 25/005
    USPC ........................................................ 700/276
    See application file for complete search history.

(56) References Cited

U.S. PATENT DOCUMENTS

| | | | |
|---|---|---|---|
| 2007/0022770 A1* | 2/2007 | Liu | F25B 49/022 62/228.1 |
| 2007/0044501 A1* | 3/2007 | Schnell | F24D 12/02 62/331 |
| 2009/0222139 A1* | 9/2009 | Federspiel | G05D 22/02 700/278 |
| 2012/0253543 A1* | 10/2012 | Laughman | F25B 49/02 700/300 |
| 2013/0151019 A1* | 6/2013 | Federspiel | F24F 11/00 700/276 |
| 2013/0186119 A1 | 7/2013 | Burns et al. | |
| 2018/0187915 A1* | 7/2018 | Nelson | F24F 11/85 |

* cited by examiner

COORDINATED OPERATION OF MULTIPLE SPACE-CONDITIONING SYSTEMS

TECHNICAL FIELD

This invention relates generally to air-conditioning systems, and more particularly to concurrent control of the operation of multiple air-conditioning systems.

BACKGROUND

Occupant comfort, health, and safety in contemporary buildings are dependent on a wide variety of factors, such as the proper management of space temperature, space humidity, and fresh air ventilation rate, as well as the related accumulation of pollutants, such as carbon dioxide ($CO_2$) or volatile organic compounds (VOCs). Many different combinations of air-conditioning systems are installed in modern buildings to meet this range of requirements. Unfortunately, a number of difficulties often arise when different combinations of heating, cooling, and ventilation systems are used for conditioning the same space.

One example of such a combination of multiple space-conditioning systems is the combination of a dedicated outdoor air system (DOAS), used to meet the latent load imposed by the fresh ventilation air, and a parallel cooling system, such as a variable refrigerant flow (VRF) system, which is used to meet the sensible load of the indoor air. These systems typically operate concurrently to manage the total heating/cooling load and supply needed ventilation air to the occupied space. Each of these systems is often designed and controlled independently, and treats the operation of other systems as disturbances. Such control strategies make it difficult to operate the equipment in a reliable and energy efficient manner.

For example, U.S. Pat. No. 7,669,433 discloses a multi-air conditioner central control system that creates a schedule for coordinated operation of different air-conditioning systems including both vapor compression cycles and ventilation systems that do not include refrigerant-containing elements. However, the communication and operation of the combined system does not teach how to operate the combination of systems to achieve some desired performance for the systems. For example, a DOAS may control the supply air temperature to a given setpoint, while the VRF system may be designed to regulate the temperature of the space to a different specified setpoint. In this case, a VRF system that is not operated in consideration of the performance of the DOAS system may cause dynamic system cycling losses, temperature fluctuations, and commensurately low system-level energy efficiency. Though this prior art does not include refrigerant-containing components in the ventilation system, the addition of a second vapor compression cycle to the ventilation system introduces numerous additional degrees of freedom into the integrated system. While this increases the potential performance of the resulting overall system, it also can make the efficient operation of the combination of systems more difficult to achieve.

SUMMARY

It is an object of some embodiments to provide a system and a method for jointly controlling different space-conditioning systems having separate refrigerant circuits and arranged to condition a common space. It is another object of some embodiments to reduce a total energy consumption of the combined operation of those space-conditioning systems. It is another object of an embodiment to jointly control a combination of a dedicated outdoor air system (DOAS) and a variable refrigerant flow (VRF) system to reduce the energy consumption of the combined system.

Some embodiments are based upon the realization that some behaviors of multiple air-conditioning systems that are serving a common space will be coupled together strongly through that space, while other behaviors of these systems will not interact through the occupied space and can be approximated as being independent, or uncoupled. As a result, some components of the constituent systems are coupled and dependent upon the behavior of other systems serving the common space, while other components of the constituent systems are largely independent upon the behavior of the other systems serving the common space. Examples of coupled components include the compressors of the air-conditioning systems, because the speed of each compressor changes the temperature of heat exchanger located in the occupied space, and thus changes the temperature of the air circulating in that space. On the other hand, examples of independent components include the expansion valves of the air-conditioning systems, because the operation of the valves affects the flow rate of the refrigerant as well as the superheat at the corresponding evaporator outlet, but has a minor dynamic effect on the temperature of the air in the space.

To this end, some embodiments are based on the realization that the operation of dependent components of the systems that affect the conditioned space should be determined jointly for the overall system, while the operation of independent components should be determined separately for each individual subsystem. For example, the operation of the compressors of multiple air-conditioning systems serving a common space should be coordinated to achieve desired setpoint temperatures and relative humidities in the space, while the operation of the expansion valves can be determined independently because changes in the position of the expansion valve for one system does not strongly affect the behavior of other systems.

Furthermore, some embodiments are based on the realization that the coordinated control and operation of coupled systems can result in energy efficiency improvements for the combined system that are greater than the energy efficiency that could be achieved by controlling each system independently. For example, a choice of the compressor frequency for each air-conditioning subsystem that takes into account other coupled compressor frequencies can result in the attainment of coupled control objectives, such as satisfying the room temperature and relative humidity setpoints, while simultaneously reducing the energy consumption for the collection of subsystems below the energy consumption that would result from their independent operation.

In light of these dynamic interactions between the subsystems, some embodiments identify setpoints for a multi-variable regulator to determine control signals for controlling operations of a group of "dependent" components of different air-conditioning systems in consideration of the coupling between systems to reduce jointly and concurrently the error between the setpoints and measured values of environment in the common space. These setpoints are identified by considering the operation of the collection of systems, rather than for each subsystem independently. Conversely, some embodiments use single-variable regulators to regulate different "independent" components of different air-conditioning systems to reduce decoupled errors affecting the operation of those air-conditioning systems. As a result, some elements of the control system that govern "dependent" or "coupled" components span the multiple subsystems, while other elements of the control system that govern "independent" components will only affect a specific subsystem.

In such a manner, instead of designing and controlling systems under the assumption of independence and treating the operation of other systems as disturbances, some embodiments develop a centralized control design to account for the dynamics of the indirect coupling. This approach can produce counterintuitive results because it implies a nontraditional control structure for these integrated systems. For example, in some embodiments, a multivariable regulator for an integrated system including DOAS and VRF subsystems uses the compressors in the systems to control the room air temperature as well as to control the relative humidity of the conditioned space. Because the compressors of both the DOAS and VRF systems influence the room air temperature and relative humidity, this multivariable regulator simultaneously controls both variables and coordinates the operation of both the DOAS and VRF systems to offset the sensible and latent loads in the conditioned space. In comparison, the respective expansion valves for each subsystem control the superheat of the evaporators in the individual vapor compression systems because of the strong correlation between the evaporator superheat and valve opening, and because of the weak correlation between the operation of the expansion valve in one subsystem and the behavior of the other subsystem.

Some embodiments are based on another realization that when at least some components of the air-conditioning systems are jointly controlled, the parameters of operations of different components of the air-conditioning systems can be optimized for that joint control. Because there are often additional system inputs that are not used to control performance variables, a model-based approach can be used to identify the additional input values that minimize the total power consumption over the range of expected operating conditions. For example, the DOAS and VRF systems usually have additional fans that are not actuated to achieve the temperature or humidity setpoints. Instead of using the values for these fan speeds that are usually selected for the independent operation of the systems, some embodiments optimize those values for joint operation of the indirectly coupled air-conditioning system. For example, one embodiment jointly optimizes speed of different fans of DOAS and VRF systems to reduce the total power consumption of the overall system.

Accordingly, one embodiment discloses a controller for controlling at least a first air-conditioning system and a second air-conditioning system arranged for conditioning a common space, wherein a refrigerant circuit of the first air-conditioning system is separate from a refrigerant circuit of the second air-conditioning system. The controller includes a multi-variable regulator to receive one or more setpoint signals and one or more measured value signals from the common space to determine control signals for controlling operations of first components of the first and the second refrigerant circuits to jointly and concurrently reduce at least one environmental error between the setpoint signals and the measured value signals; a first single-variable regulator to receive a first setpoint signal and a measured value signal of the operation of a second component of the first air-conditioning system and to determine a control signal for controlling the operation of the second component of the first air-conditioning system that reduces a first operational error of the second component of the first air-conditioning system; a second single-variable regulator to receive a second setpoint signal and a measured value signal of the operation of a second component of the second air-conditioning system and to determine a control signal for controlling the operation of the second component of the second air-conditioning system that reduces a second operational error of the second component of the second air-conditioning system; a memory storing a lookup structure mapping control signals controlling operations of a third component of the first air-conditioning system and a third component of the second air-conditioning system as a function of the control signals controlling operations of the first components of the first and the second air-conditioning systems; a processor to determine the control signals controlling operations of the third components of the first and the second air-conditioning systems by selecting the control signals from the lookup structure according to the control signals determined by the multi-variable regulator; and an electrical circuit for controlling the first and the second air-conditioning systems according to the determined control signals.

Another embodiment discloses a controller for controlling at least two air-conditioning systems including a first air-conditioning system and a second air-conditioning system arranged for conditioning a common space, wherein a refrigerant circuit of the first air-conditioning system is separate from a refrigerant circuit of the second air-conditioning system. The controller includes a multi-variable regulator to determine concurrently a first speed of a first compressor of the first air-conditioning system and a second speed of a second compressor of the second air-conditioning system that jointly reduce an error between setpoint values of temperature and humidity in the common space and measured values of the temperature and the humidity in the common space; a first single-variable regulator to determine a first opening of a first valve of the first air-conditioning system that reduces an error between a target suction superheat of the first air-conditioning system and a current suction superheat of the first air-conditioning system; a second single-variable regulator to determine a second opening of a second valve of the second air-conditioning system that reduces an error between a target suction superheat of the second air-conditioning system and a current suction superheat of the second air-conditioning system, wherein the first opening of the first valve is determined independently from the second opening of the second valve; a memory storing a lookup structure mapping values of the speed of the compressors in the first and the second air-conditioning systems to values of speed of fans in the first and the second air-conditioning systems optimizing total energy efficiency of the first and the second air-conditioning systems operating according to the corresponding values of the speed of the compressors in the first and the second air-conditioning systems; a processor to select a first fan speed of a first fan of the first air-conditioning system and a second fan speed of a second fan of the second air-conditioning system from the lookup structure using the first and the second speeds of the first and the second compressors; and an electrical circuit to control the first compressor to have the first speed, the second compressor to have the second speed, the first valve to have the first opening, the second valve to have the second opening, the first fan to have the first fan speed, and the second fan to have the second fan speed.

Yet another embodiment discloses a method for controlling at least two air-conditioning systems including a first air-conditioning system and a second air-conditioning system arranged for conditioning a common space, wherein a refrigerant circuit of the first air-conditioning system is separate from a refrigerant circuit of the second air-conditioning system. The method includes determining, using a multi-variable regulator, control signals for controlling operations of first components of the first and the second refrigerant circuits to jointly and concurrently reduce the environmental error between a setpoint and a measured value from a common space; determining, using a first single-variable regulator, a control signal for controlling an operation of a second component of the first refrigerant circuit that reduces a first operational error between a first setpoint and a measured value of the operation of the second component of the second air-conditioning system; determining, using a second single-variable regulator, a control signal for controlling an operation of a second component of the second refrigerant circuit that reduce a second operational error between a second setpoint and a measured value of the operation of the second component of the second air-conditioning system; determining, using a processor operatively connected to a memory storing a lookup structure mapping control signals controlling operations of a third component of the first air-conditioning system and a third component of the second air-conditioning system as a function of the control signals controlling operations of the first components of the first and the second air-conditioning systems, control signals controlling operations of the third components of the first and the second air-conditioning systems by selecting the control signals from the lookup structure according to the control signals determined by the multi-variable regulator; and controlling, using an electrical circuit, the first and the second air-conditioning systems according to the determined control signals.

Definitions

In describing embodiments of the invention, the following definitions are applicable throughout (including above).

A "vapor compression system" refers to a system that uses the vapor compression cycle to move refrigerant through components of the system based on principles of thermodynamics, fluid mechanics, and/or heat transfer. The vapor compression systems can be, but are not limited to, a heat pump, refrigeration, and an air-conditioner system. Vapor compression systems are used in applications beyond the conditioning of residential or commercial spaces. For example, vapor compression cycles can be used to cool computer chips in high-performance computing applications.

An "HVAC" system refers to any heating, ventilating, and air-conditioning (HVAC) system implementing the vapor compression cycle. HVAC systems span a very broad set of systems, ranging from systems which supply only outdoor air to the occupants of a building, to systems which only control the temperature of a building, to systems which control the temperature and humidity.

A "dedicated outdoor air system" (DOAS) refers to a system which uses separate equipment to condition all outdoor air brought into a building for ventilation and delivered to each occupied space, either directly or in conjunction with local space or central (zoned) HVAC units serving those same spaces. The local or central HVAC units are used to maintain space temperature setpoint requirements.

A "variable refrigerant flow (VRF) system" refers to a multi-split system which includes multiple indoor units connected to a single or multiple condensing units. VRF systems are larger capacity, more complex versions of ductless multi-split systems, with the additional capability of connecting ducted style fan coil units. They do not provide ventilation, so a separate ventilation system is necessary.

"Components of a vapor compression system" refer to any components of the vapor compression system having an operation controllable by the control systems. The components include, but are not limited to, a compressor having a variable speed for compressing and pumping the refrigerant through the system; an expansion valve for providing an adjustable pressure drop between the high-pressure and the low-pressure portions of the system, and an evaporating heat exchanger and a condensing heat exchanger, each of which incorporates a variable speed fan for adjusting the air-flow rate through the heat exchanger.

An "evaporator" refers to a heat exchanger in the vapor compression system in which the refrigerant passing through the heat exchanger evaporates over the length of the heat exchanger, so that the specific enthalpy of the refrigerant at the outlet of the heat exchanger is higher than the specific enthalpy of the refrigerant at the inlet of the heat exchanger, and the refrigerant generally changes from a liquid to a gas. There may be one or more evaporators in the vapor compression system.

A "condenser" refers to a heat exchanger in the vapor compression system in which the refrigerant passing through the heat exchanger condenses over the length of the heat exchanger, so that the specific enthalpy of the refrigerant at the outlet of the heat exchanger is lower than the specific enthalpy of the refrigerant at the inlet of the heat exchanger, and the refrigerant generally changes from a gas to a liquid. There may be one or more condensers in a vapor compression system.

A "refrigerant circuit" refers to an interconnection of refrigerant pipes and components into a closed configuration, so that the refrigerant flows in a closed path between a series of components. Refrigerant circuits can be used to construct closed thermodynamic cycles to efficiently transfer thermal energy from one location to another. For example, a refrigerant circuit for a vapor compression system includes a compressor, a condensing heat exchanger, an expansion valve, and an evaporating heat exchanger, as well as the pipes that are used to convey the refrigerant from each component to the next.

An "electrical circuit" refers to an interconnection of wires that transmits electrical signals between components, such as processors, memory, or actuators.

"Set of control signals" refers to specific values of the inputs for controlling the operation of the components of the vapor compression system. The set of control signals includes, but is not limited to, values of the speed of the compressor, the position of the expansion valve, the speed of the fan in the evaporator, and the speed of the fan in the condenser.

A "setpoint" refers to a target value of the system, such as the vapor compression system, aiming to reach and maintain as a result of the operation. The term setpoint is applied to any particular value of a specific set of control signals and thermodynamic and environmental parameters.

A "computer" refers to any apparatus that is capable of accepting a structured input, processing the structured input according to prescribed rules, and producing results of the processing as output. Examples of a computer include a general-purpose computer; a supercomputer; a mainframe; a super mini-computer; a mini-computer; a workstation; a microcomputer; a server; an interactive television; a hybrid combination of a computer and an interactive television; and application-specific hardware to emulate a computer and/or software. A computer can have a single processor or multiple processors, which can operate in parallel and/or not in parallel. A computer also refers to two or more computers connected together via a network for transmitting or receiving information between the computers. An example of such a computer includes a distributed computer system for processing information via computers linked by a network.

A "central processing unit (CPU)" or a "processor" refers to a computer or a component of a computer that reads and executes software instructions.

A "memory" or a "computer-readable medium" refers to any storage for storing data accessible by a computer. Examples include a magnetic hard disk; a floppy disk; an optical disk, like a CD-ROM or a DVD; a magnetic tape; a memory chip; and a carrier wave used to carry computer-readable electronic data, such as those used in transmitting and receiving e-mail or in accessing a network, and a computer memory, e.g., random-access memory (RAM).

"Software" refers to prescribed rules to operate a computer. Examples of software include software; code segments; instructions; computer programs; and programmed logic. Software of intelligent systems may be capable of self-learning.

A "module" or a "unit" refers to a basic component in a computer that performs a task or part of a task. It can be implemented by either software or hardware.

A "controller," "control system," and/or "regulator" refer to a device or a set of devices to manage, command, direct or regulate the behavior of other devices or systems. The controller can be implemented by hardware, a processor with operation configured by the software, and combination thereof. The controller can be an embedded system.

DETAILED DESCRIPTION

Figure 1:
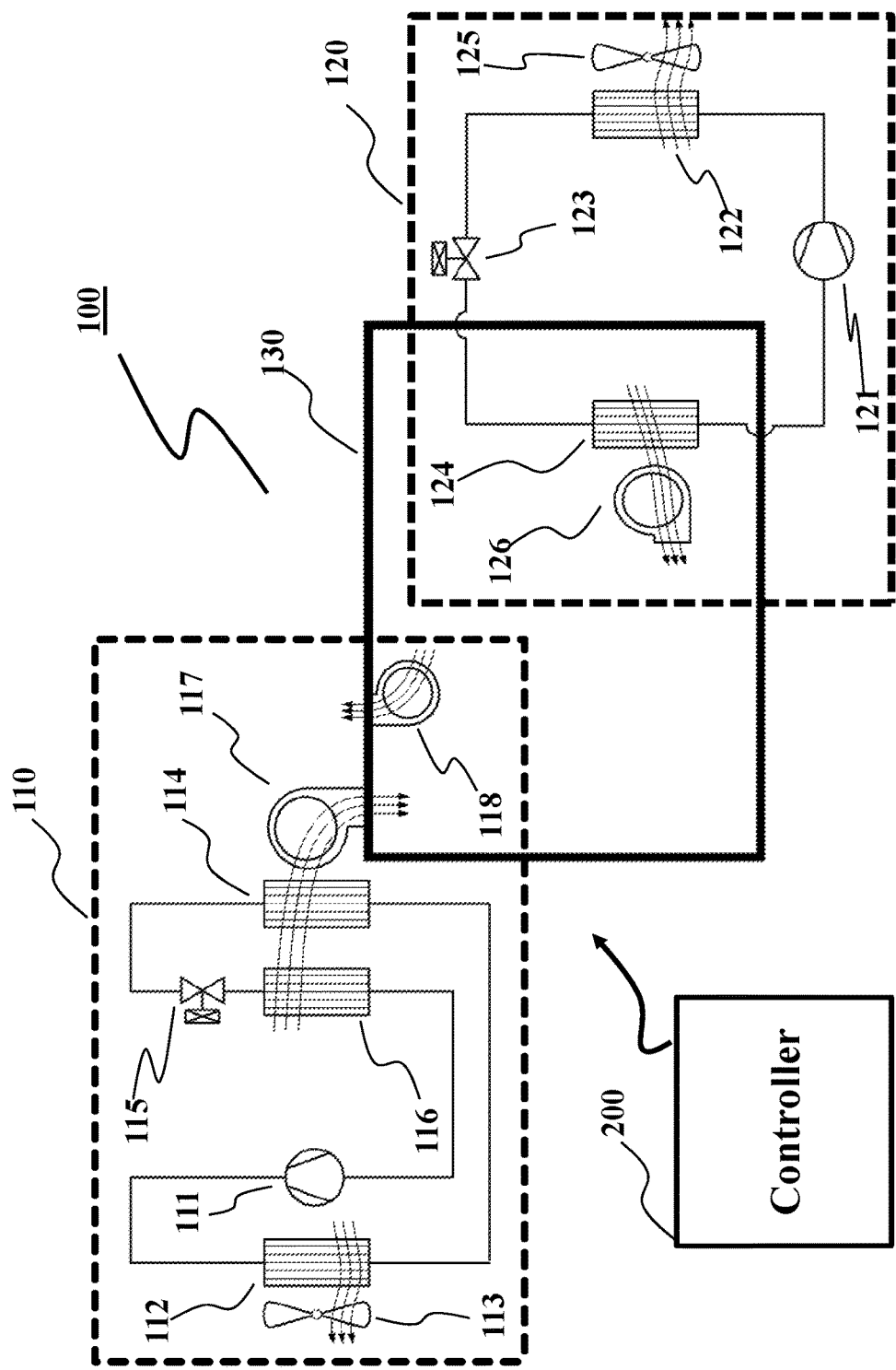
FIG. 1 shows a schematic of an integrated air-conditioning system that provides heating, cooling and/or ventilation to a common space according to some embodiments.

FIG. 1 shows a schematic of an integrated air-conditioning system 100 that provides heating, cooling and/or ventilation to a common space 130. The integrated system includes at least a first air-conditioning system 110 and a second air-conditioning system 120 arranged for conditioning a common space 130. The systems 110 and 120 are separate systems, i.e., a first refrigerant circuit of the first air-conditioning system is separate from a second refrigerant circuit of a second air-conditioning system. For example, the first system 110 can include a dedicated outdoor air system (DOAS) and the second air-conditioning system 120 can include a variable refrigerant flow (VRF).

For example, the DOAS handles a parasitic latent load and a portion of sensible load. Specifically, the DOAS dehumidifies and tempers the outdoor air to meet both the latent cooling and the ventilation requirements for the space. The VRF system acts as zone-level heating and cooling equipment, and provides occupants with air circulation and thermal comfort by modulating the capacity to match the remaining sensible and latent loads in the space.

Both systems include a variety of components, e.g., variable setting actuators to perform refrigerant cycles. For example, the DOAS can include a variable-speed compression device 111, an outdoor heat exchanger 112, a variable-speed outdoor unit fan 113, an additional heat exchanger commonly referred to as a reheat coil 114, an expansion device 115, and an evaporating heat exchanger or cooling coil 116. Those components are all connected in a closed loop series refrigerant flow arrangement. The conditioned outdoor air is directly delivered to the occupied space by the supply air fan 117 after consecutively flowing through the cooling coil and reheat coil, whereas the stale air is dispelled out by the exhaust air fan 118 to keep the occupied space well ventilated.

The VRF system can be implemented as a refrigerant vapor compression system that includes a variable-speed compression device 121, an outdoor heat exchanger 122, an expansion device 123, an indoor heat exchanger 124, a variable-speed outdoor unit fan 125 and an air circulation blower 126.

Depending upon the way that the conditioned outdoor air (OA) is delivered, there are different configurations for the integration of the DOAS and the local heating/cooling equipment, e.g. a VRF system. In the first configuration, the conditioned outdoor air is directly delivered to the conditioned space 130. This configuration typically requires some additional ductwork and a separate diffusion for the outdoor air. In the second configuration, the conditioned OA is ducted to the supply-side of the local unit and is mixed with the local unit's supply air before being delivered to the zone/space. The local unit conditions only recirculated air.

In another configuration, the DOAS delivers the conditioned OA to the intakes of local air-conditioning equipment, where the conditioned OA mixes with air circulating in the conditioned space and this mixture is delivered through a single duct system and diffusers. Yet another configuration delivers conditioned OA to an open ceiling plenum, near the intake of each local unit. The OA mixes with recirculated air in the plenum before being drawn into the intake of the local unit.

Figure 2A:
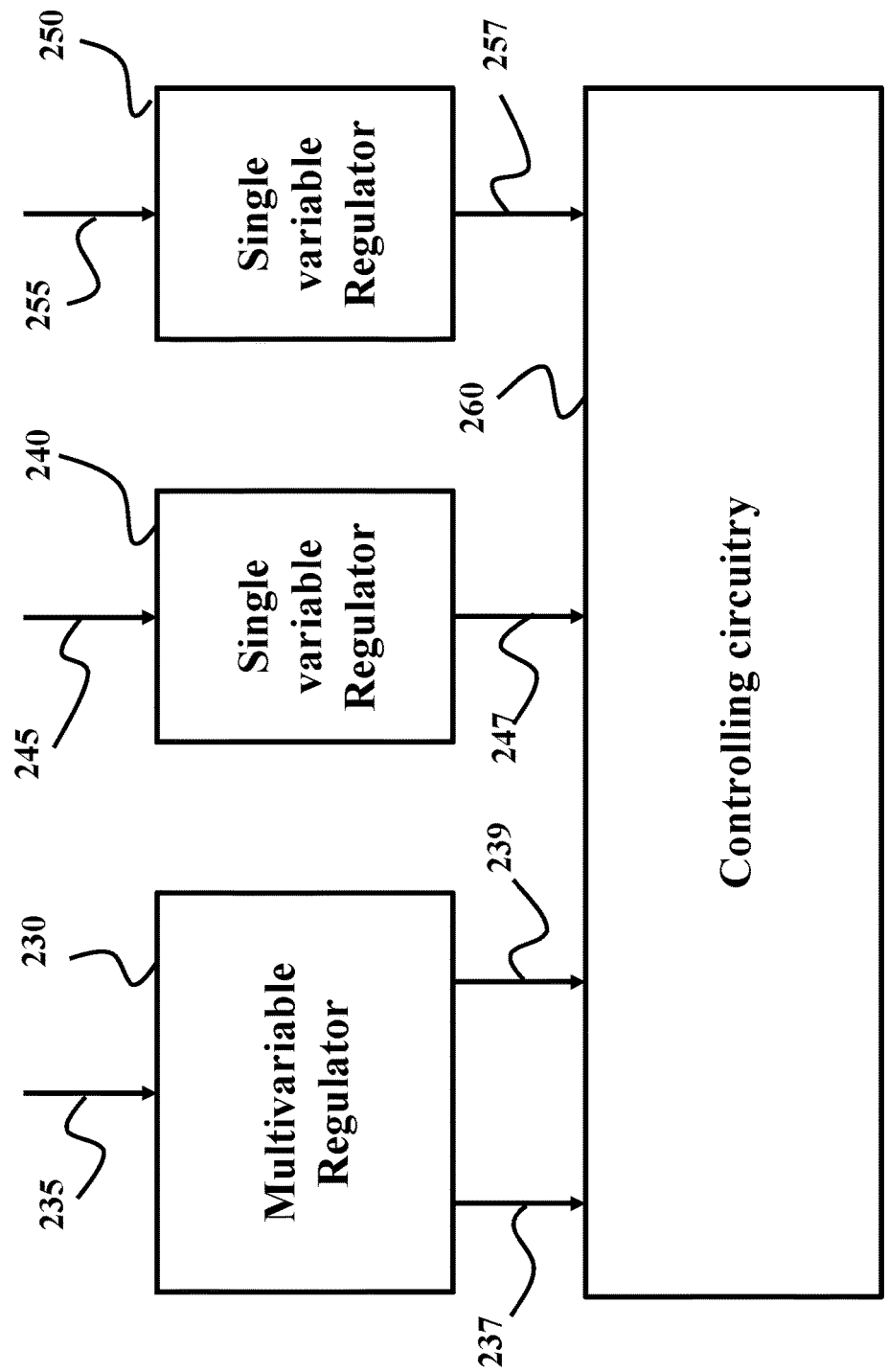
FIG. 2A shows a block diagram of a controller for controlling at least a first air-conditioning system and a second air-conditioning system according to some embodiments.

FIG. 2A shows a block diagram of a controller for controlling at least a first air-conditioning system, e.g., the system 110, and a second air-conditioning system, e.g., the system 120, arranged for conditioning a common space, such as the space 130, according to some embodiments. Because they condition the common space, the first and second systems are indirectly coupled. However, the systems are independent, i.e., a first refrigerant circuit of the first air-conditioning system is separate from a second refrigerant circuit of a second air-conditioning system.

The controller includes a multi-variable regulator 230 and at least two single-variable regulators 240 and 250. The multi-variable regulator 230 performs a joint control of some components of the first and the second air-conditioning systems 110 and 120, while at least two single-variable regulators 240 and 250 perform an independent control of some other components of the systems 110 and 120.

For example, during an operation of the controller, the multi-variable regulator 230 receives signals 235 including setpoint and measured values in the common space and determines control signals 237 and 239 controlling operations of the first and the second refrigerant circuits to jointly and concurrently reduce the errors between the setpoint and measured values 235. In one embodiment, the first components include compressors of the of the first and the second air-conditioning systems, and the multi-variable regulator outputs speeds of the compressors, such that the first and the second refrigerant circuits operated by the compressors running with the outputted speeds jointly reduce the errors 235.

This multi-variable regulator can be implemented as a set of coupled linear or nonlinear equations, wherein the regulator determines control input values based on the solution of a set of simultaneous equations. In some embodiments, the multi-variable regulator may be represented as a p x m controller matrix and the errors as an m-dimensional error vector. Then the p-dimensional vector of control values are determined by multiplying the controller matrix by the error vector. In this embodiment, coupling between the first and second air conditioning systems are accounted for by appropriately determining the elements of the control matrix. The elements of the control matrix can be determined using standard multi-variable controller design techniques known in the field such as linear quadratic regulator (LQR) methods or H-infinity synthesis methods.

For example, the values of the environment in the common space can include one or combination of values of temperature and humidity in the common space, such that the speeds of compressors of the first and the second air-conditioning systems are jointly determined to reduce the environmental error including an error between setpoint values of temperature and humidity in the common space and measured values of the temperature and the humidity in the common space.

For example, during an operation of the controller, a first single-variable regulator 240 receives a set of first operational signals 245 including setpoints and measured values of an operation of a second component of the first refrigerant circuit and determines a control signal 247 controlling the operation of the second component of the first refrigerant circuit that reduces the first operational error. For example, the second component of the first air-conditioning system can be a valve, and the first single-variable regulator determines an opening of a valve of the first air-conditioning system that reduces an error between a target suction superheat of the first air-conditioning system and a current suction superheat of the first air-conditioning system.

For example, during an operation of the controller, a second single-variable regulator 240 receives a second operational error 255 between setpoint and measured values of an operation of a second component of the second refrigerant circuit and determine a control signal 257 controlling the operation of the second component of the second refrigerant circuit that reduce the second operational error 255. For example, the second component of the second air-conditioning system can be a valve, and the second single-variable regulator determines an opening of a valve of the second air-conditioning system that reduces an error between a target suction superheat of the second air-conditioning system and a current suction superheat of the second air-conditioning system.

The controller can also include an electrical circuit 260 for controlling the first and the second air-conditioning systems according to the determined control signals 237, 239, 247, and 257.

Figure 2B:
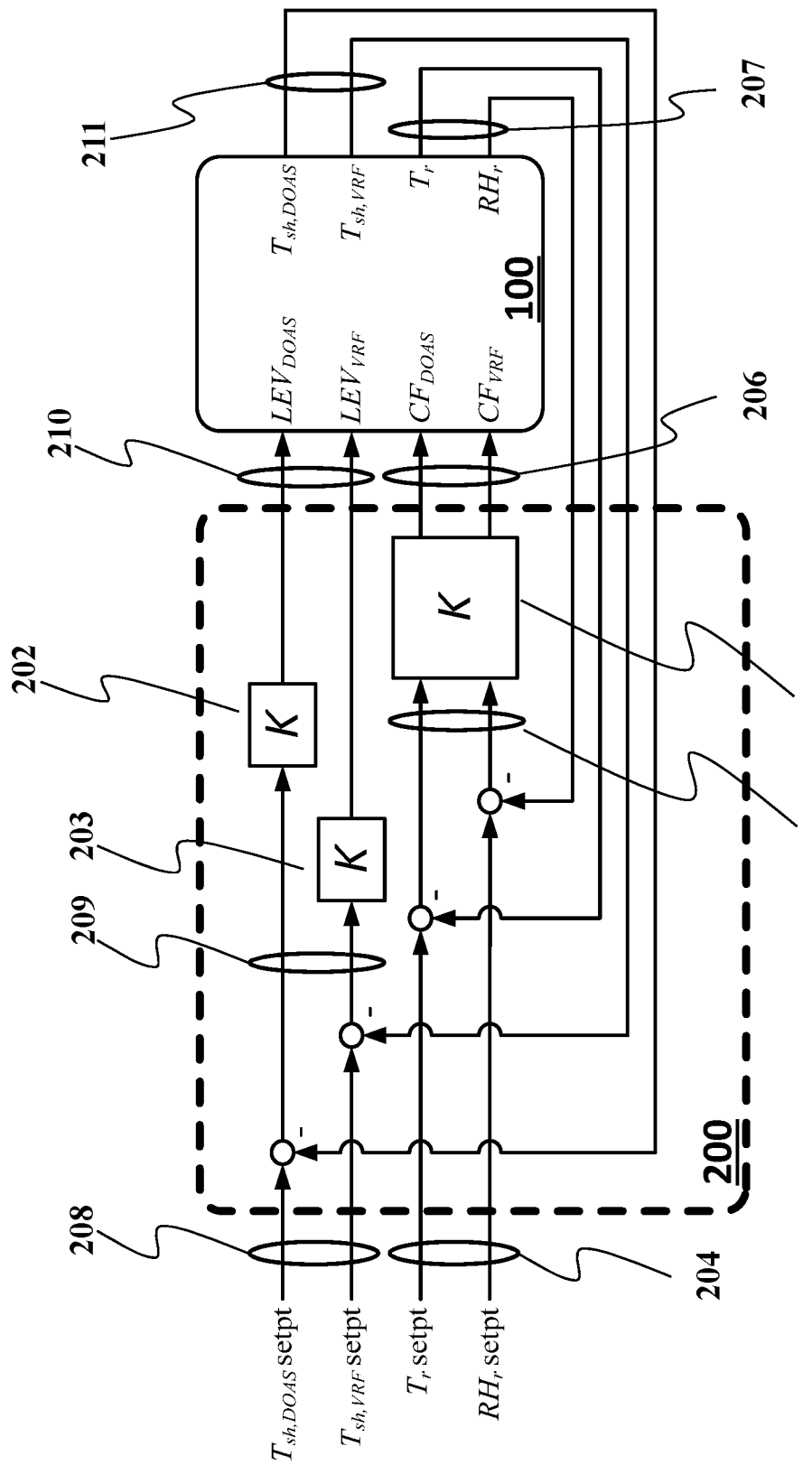
FIG. 2B shows an exemplar schematic of control architecture of the controller of FIG. 2A.

FIG. 2B shows an exemplar schematic of control architecture 200 of the controller of FIG. 2A. This control architecture is suitable for controlling indirectly coupled DOAS and VRF systems. The control architecture not only exploits the coupling nature between separate subsystems through the common conditioned space, but also takes into consideration the operating characteristics inherently within individual subsystems.

The coupling between the subsystems lies in that the temperature and relative humidity (RH) of the conditioned space can be affected by any subsystems. The compressor speeds of both the DOAS and the VRF system will affect the room air temperature and RH, and a change in either compressor speed will also cause the room air temperature and RH to change. In comparison, the expansion valve position for the DOAS or the VRF will only have a significant effect on the evaporator superheat temperature or compressor discharge temperature of that individual system, and will have a minimal effect on the operation of the other system. In consideration of this fact, both multivariable controllers and decentralized/single-input-single-output controllers are used in the control architecture.

The control architecture 200 includes a multivariable feedback regulator 201 and two single-input-single-output (SISO) feedback regulators 202 and 203. The feedback regulator 201 receives error signals 205 representing the differences between desired setpoints 204 for room temperature and RH, and measurements 207 of the corresponding signals. The feedback regulator is designed to select actuator commands such that the error signals are driven to zero. The actuator commands output from the feedback regulator 201 are the compressor frequency commands 206 of both subsystems. In this way, the compressor speeds of both subsystems are controlled so that the room temperature and RH measurements meet their setpoints.

The decoupled SISO feedback controllers 202 and 203 (used to control the suction superheat of the DOAS and the VRF system, respectively) receive error signals 209 representing the differences between desired setpoints 208 for suction superheat temperature of subsystems and the measurements 211 of the corresponding signals. The actuator commands output from the feedback regulators 202 and 203 are the expansion valve position 210 of the DOAS and the VRF system, respectively. In this way, the expansion valve positions are regulated through decoupled control loops so that the compressor superheat temperatures meet their setpoints.

Figure 2C:
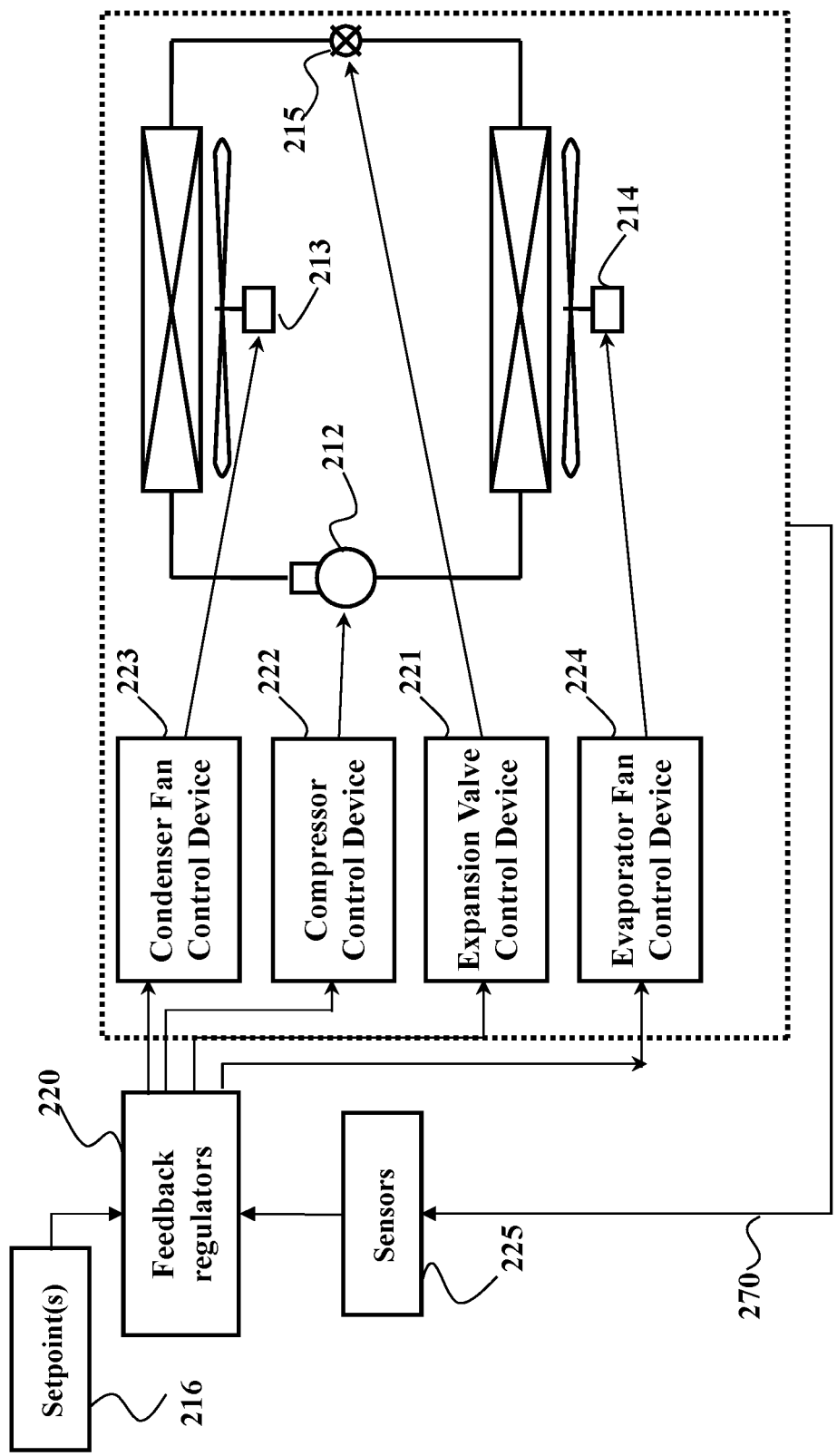
FIG. 2C shows a block diagram the controller including exemplar electrical circuitry controlling different components of air-conditioning systems according to one embodiment.

FIG. 2C shows a block diagram of the controller including exemplar electrical circuitry 260 controlling different components of one or combination of systems 110 and 120 according to one embodiment. The components include one or combination of an evaporator fan 214, a condenser fan 213, an expansion valve 215, and a compressor 212. The electrical circuitry 260 includes a compressor control device 222, an expansion valve control device 221, an evaporator fan control device 224, and a condenser fan control device 223.

The controller determines control signals to the elements of the electrical circuitry 260 using feedback regulators 220 including regulators 230, 240, and 250. The regulators 220 responsible for accepting setpoints 216 and readings of a sensor 225 are indicative of the parameters of operation 270 of the air-conditioning systems, and outputting a set of control signals for operation of the components of the air-conditioning systems.

For example, the controller can include a set of sensor determining, during operation of the air-conditioning systems, one or combination of signals indicative of measurements of environment in the common space and measurements of the operations of the first and the second air-conditioning systems. The controller can also include a set of couplers for combining the signals with corresponding target values of the environment and the operations of the first and the second air-conditioning systems to produce the environmental error and the first and the second operational errors.

Some embodiments are based on another realization that when at least some components of the air-conditioning systems are jointly controlled, the parameters of operations of different components of the air-conditioning systems can be optimized for that joint control. For example, because there are often additional system inputs that are not used to control performance variables, a model-based approach can be used to identify the additional input values that minimize the total power consumption over the range of expected operating conditions.

For example, the DOAS and VRF systems usually have additional fans that are not actuated to achieve the temperature or humidity setpoints. Typically, the control inputs to these fans are selected to minimize the energy consumption at a single design point. However, the energy consumption of the system is suboptimal at off-design conditions with these choices of input values.

To that end, some embodiments, instead of using the values for these fan speeds selected for independent operation of the systems, optimize those values for joint operation of the indirectly coupled air-conditioning system. For example, one embodiment jointly optimizes the speeds of different fans of DOAS and VRF systems to reduce the total power consumption of the combined systems.

Figure 3:
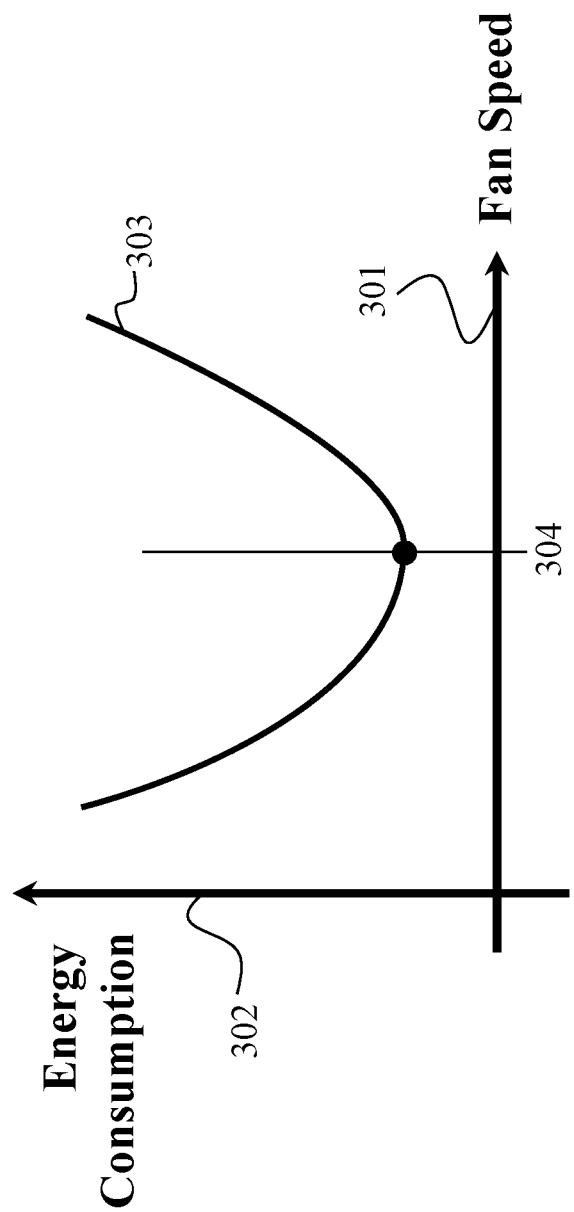
FIG. 3 shows a graph of a convex relationship in the steady state mapping between control signals for controlling one or several actuators of the vapor compression system used by some embodiments.

FIG. 3 shows a graph of a convex relationship 303 in the steady state mapping between control signal for controlling one or several actuators of the vapor compression system, such as the outdoor unit fan speed 301 and the metric of performance 302. For example, if the metric of performance is the energy consumption of the vapor compression system, the relationship 303 shows that for constant temperatures and heat loads, there exists one set of actuators commands that minimizes energy consumption 304. Therefore, it is desirable to operate the vapor compression system using the combination of inputs that minimizes energy consumption and maximizes the efficiency of the system. To that end, one embodiment leverages advances in modeling and optimization technology by developing steady-state physical models of the system to determine the optimal values of inputs for a wide range of operating conditions.

Figure 4A:
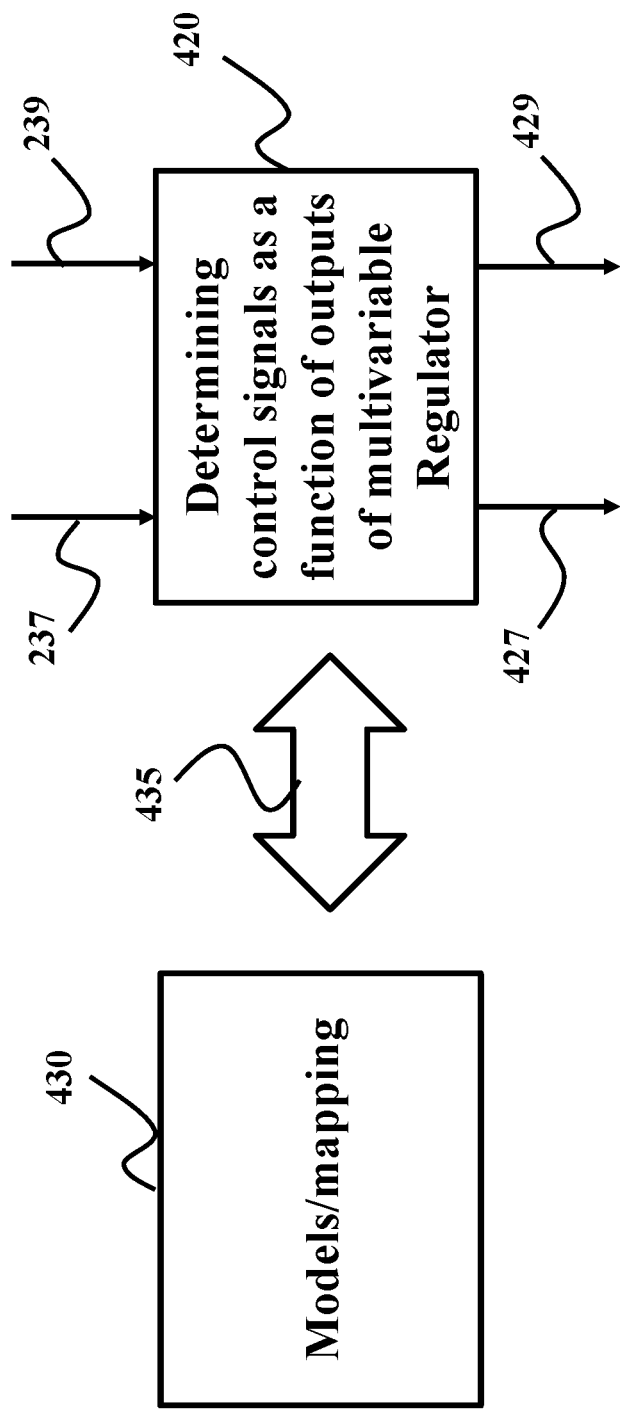
FIG. 4A shows a schematic of a system for reducing energy consumption of air-conditioning systems according to some embodiments.

FIG. 4A shows a schematic of a system for reducing energy consumption of air-conditioning systems 110 and 120 according to some embodiments. In these embodiments, the controller includes a processor 420 to determine control signals 427/429 controlling operations of third components of the first and the second air-conditioning systems as a function of the control signals 237 and 239 controlling operations of the first components of the first and the second refrigerant circuits.

For example, in one embodiment, the processor optimizes the operations of third components of the first and the second air-conditioning systems for the operations of the first components of the first and the second air-conditioning systems using a model of the first and the second air-conditioning systems. The models can be stored in a memory 430 operatively connected to the processor 420. In this embodiment, the processor performs the optimization during the operation of the air-conditioning systems.

In an alternative embodiment, the optimization is performed offline for different combinations of values of the control signals 237 and 239, which allows the processor to select from the memory the values of the control signals 427/429 predetermined for the current values of the control signals 237/239. For example, the memory 430 can store a lookup structure mapping the control signals 427/429 controlling operations of the third components of the first and the second air-conditioning systems to the function of the control signals 237/239 controlling operations of the first components of the first and the second refrigerant circuits. For example, the control signals for the third components are predetermined using the model of the air-conditioning system to optimize total energy efficiency of the first and the second air-conditioning systems having the first components controlled with the control signals determined by the multivariable regulator. The processor selects or computes 435 the control signals 427/429 controlling operations of the third components of the first and the second air-conditioning systems from the lookup structure in the memory 430.

Figure 4B:
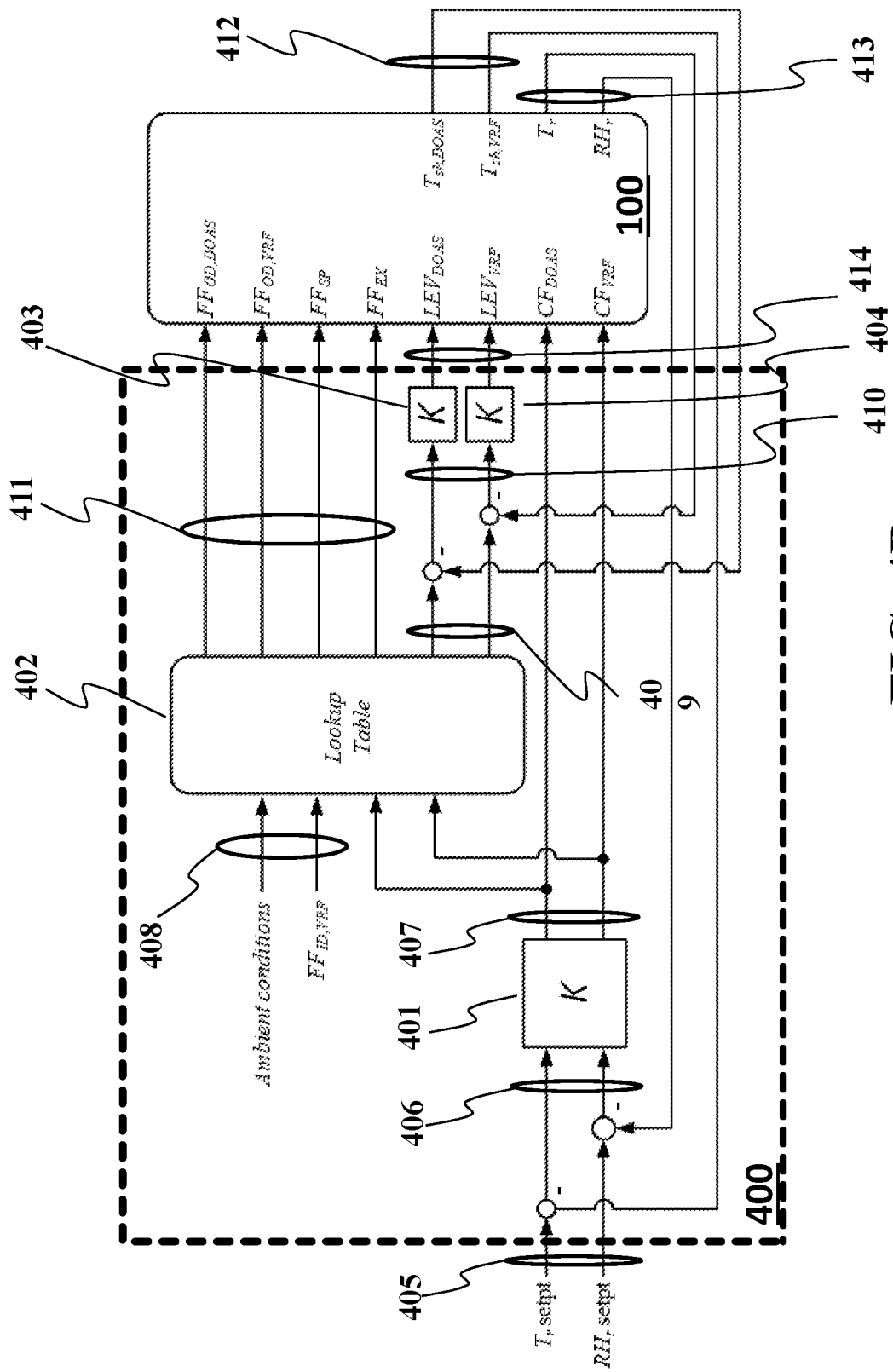
FIG. 4B shows the control architecture of the integrated system that regulates the fan speeds of the subsystems so that the overall power consumption is minimized according to some embodiments.

FIG. 4B shows the control architecture 400 of the integrated system 100 that regulates the fan speeds of the subsystems so that the overall power consumption is minimized according to some embodiments. In these embodiments, the first components of the first and the second air-conditioning systems include a compressor of the first air-conditioning system and a compressor of the second air-conditioning system, wherein the third components of the first and the second air-conditioning systems include a fan in the first air-conditioning system and a fan in the second air-conditioning system. The processor selects the speed of the fans in the first and second air-conditioning systems from the memory values to optimize the total energy efficiency of the first and the second air-conditioning systems operating according to the values of the speed of the compressors in the first and the second air-conditioning systems.

The control architecture 400 includes a multivariable feedback regulator 401, a look-up table or a function 402 providing the optimal fan speed commands 411 and optimal suction superheat setpoints 409, and two single-input-single-output (SISO) feedback regulators 403 and 404. The feedback regulator 401 receives error signals 406 representing the differences between desired setpoints 405 for room temperature and RH, and measurements 413 of the corresponding signals. The actuator commands output from the feedback regulator 401 are the compressor frequency commands 406 of the subsystems.

The compressor frequency commands 407 are then fed into the lookup table 402 that outputs the optimal combination of suction superheat setpoints 409, and the outdoor unit fan speeds of subsystems, the supply air fan speed and the exhaust air fan speed at a given ambient condition and indoor unit fan speed of the VRF system 408.

The decoupled SISO feedback controllers 403 and 404 (used to control the suction superheats of the DOAS and the VRF system, respectively) receive error signals 410 representing the differences between the optimal suction superheat setpoints 409 and the measurements 412 of the corresponding signals. The actuator commands output from the feedback regulators 403 and 404 are the expansion valve position 414 of the DOAS and the VRF system, respectively. In this way, the expansion valve positions are regulated through decoupled control loops so that the compressor superheat temperatures meet their setpoints.

Figures 5A, 5B:
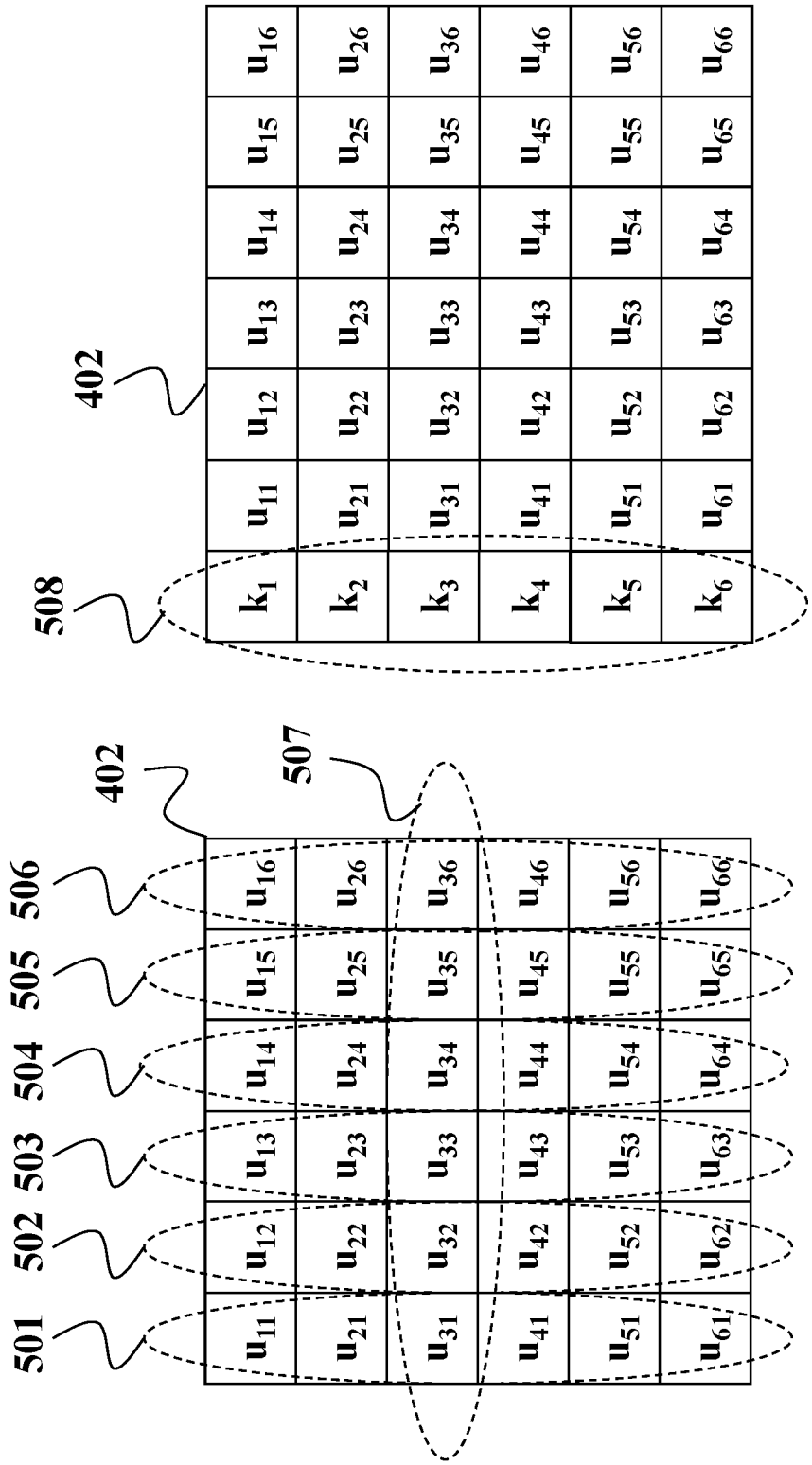
FIG. 5A and FIG. 5B show examples of the look-up table for storing the sets of control inputs according to some embodiments.

FIG. 5A and FIG. 5B show examples of the look-up table 402 for storing the sets of control inputs, such as the set of 507, according to some embodiments. Each set stored in the lookup table is determined to be optimal according to a metric of performance, e.g., the energy consumption of the integrated HVAC system. Each element of the sets of control inputs is responsible for the operation of at least one component of the integrated system. For example, elements 501 and 502 are responsible for the operation of the speeds of the outdoor unit fans for the DOAS and the VRF system, respectively, and values of those elements are values of revolutions per minute (RPM) of the fans. Similarly, elements 503 and 504 are responsible for the operation of the speeds of the supply air fan and exhaust air fan, respectively. Also, elements 505 and 506 are responsible for the optimal setpoints of the suction superheat of subsystems which are used for the operation of the expansion valves, and values of those elements are in units of temperature (e.g., Kelvin).

The sets of the control inputs are identified by the keys 508, i.e., the compressor speeds and the ambient conditions including temperature and RH, which are external to the set. Since users usually have the authority to change the speed of the indoor unit fan of the parallel cooling/heating system, e.g., VRF system, based on their own needs and preferences, it is reasonable to incorporate this speed into the key vector. One of the requirements of being the keys is measurable. The optimal control inputs are significantly dependent upon the thermal loads in the conditioned space. However, the thermal loads are unknown and not measurable during the operation. Hence, they are not suited for the key. Given the fact that there is a strong relationship between the thermal loads and the compressor speeds of subsystems, the compressor speeds are selected for surrogate keys from the feedback controller in lieu of thermal loads. Meanwhile, the ambient conditions including temperature and RH have a significant impact on the thermal loads. Therefore, they are selected to be a part of the keys.

The sets of the control inputs are determined as a function of the keys to optimize the operation of the vapor-compression system according to the metric. The function of the key can, e.g., smooth or interpolate the data stored in the lookup table, or leave the control inputs unchanged.

In some embodiments, the construction of the look-up table for the optimal control inputs leverages advances in modeling and optimization technology by developing steady-state physical models of the system to determine the optimal values of inputs for a wide range of operating conditions. First, a set of computer-based steady-state models capable of predicting the performance of the integrated system over a wide range of operating conditions are developed. The models describe the thermodynamics of the refrigerant using established physics-based descriptions of the fluid mechanical and heat transfer processes that take place in the vapor compression system. These models are then validated against experimental data to ensure the prediction accuracy. Based on the validated models, a sequence of optimizations are conducted with an objective of minimizing the overall power consumption of the integrated system by seeking the optimal combination of multiple system inputs, i.e., ambient conditions, compressor speeds, fan speeds, and suction superheats. Finally, the optimal values of the inputs are tabulated in the manner illustrated above. Typically, the information stored in this lookup table is generated ahead of time, e.g., when the system is manufactured, rather than during the operation of the system. Some embodiments use multiple lookup tables. In those embodiments, each lookup table is associated with particular environmental parameters. Based on those parameters, the control module uses a particular lookup table that corresponds to the value of the parameters.

Figure 6:
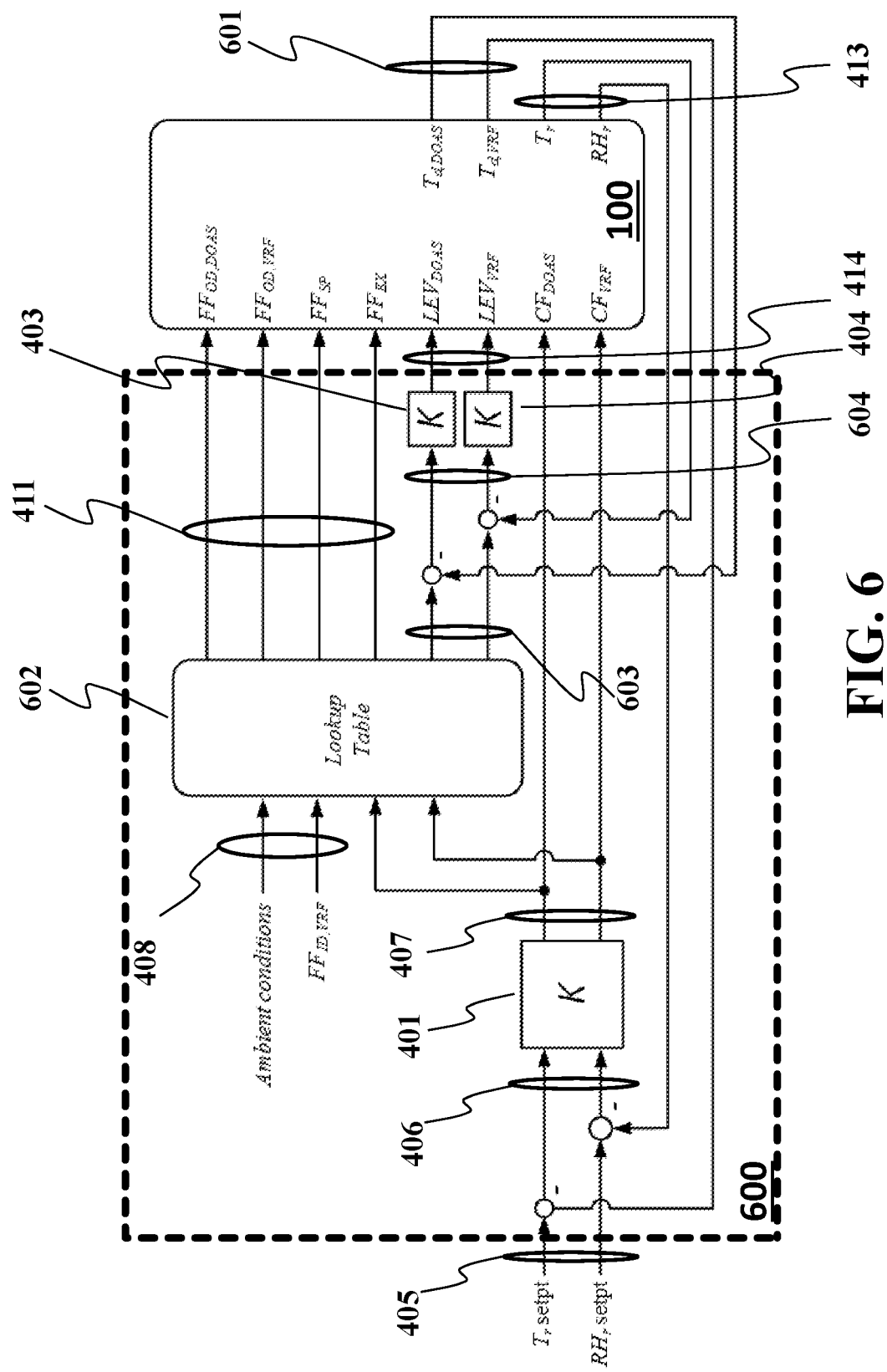
FIGS. 6, 7, and 8 show different embodiments of a controller controlling indirectly coupled air-conditioning systems.

FIG. 6 shows an alternative embodiment of a controller 600 controlling indirectly coupled air-conditioning systems. In this embodiment, the processor selects from the memory a value of the target suction superheat of the first air-conditioning system and a values of the target suction superheat of the second air-conditioning system based on the values of the speed of the compressors in the first and the second air-conditioning systems. To that end, the compressor speeds of both subsystems are controlled in the same way so that the room temperature and humidity measurements meet their setpoints, but the decoupled control loops are used to regulate the expansion valve positions so that the compressor discharge temperatures 601 meet their setpoints 603 that are determined by the look-up table 602.

Figure 7:
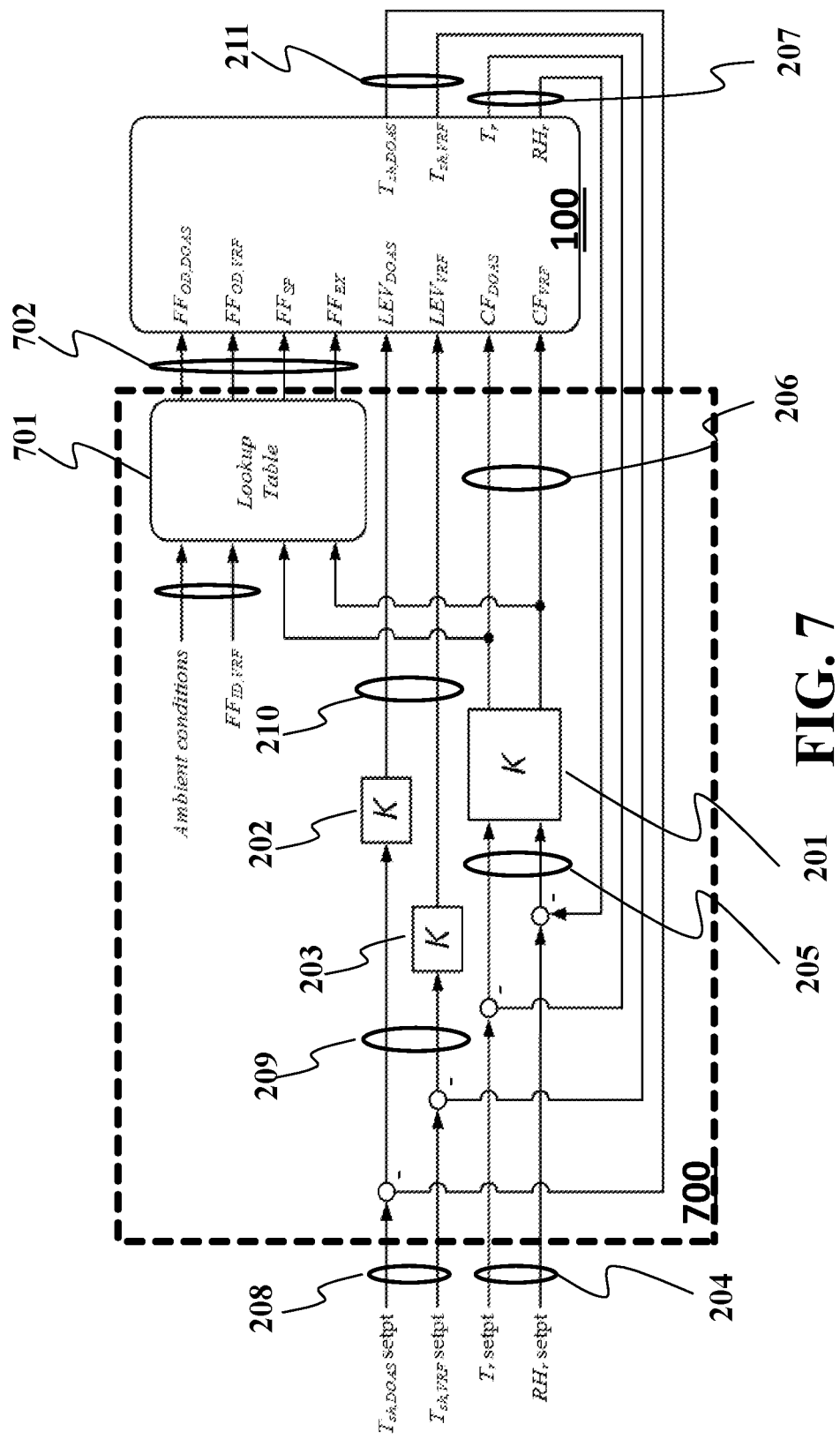

FIG. 7 shows another embodiment of a controller 700 controlling indirectly coupled air-conditioning systems. In this embodiment, the fan speeds 702 are controlled to minimize the overall power consumption of the integrated system. In this embodiment, the suction superheat setpoints are determined by the system or users and are not optimized in order to shrink the size of the look-up table 701.

Figure 8:
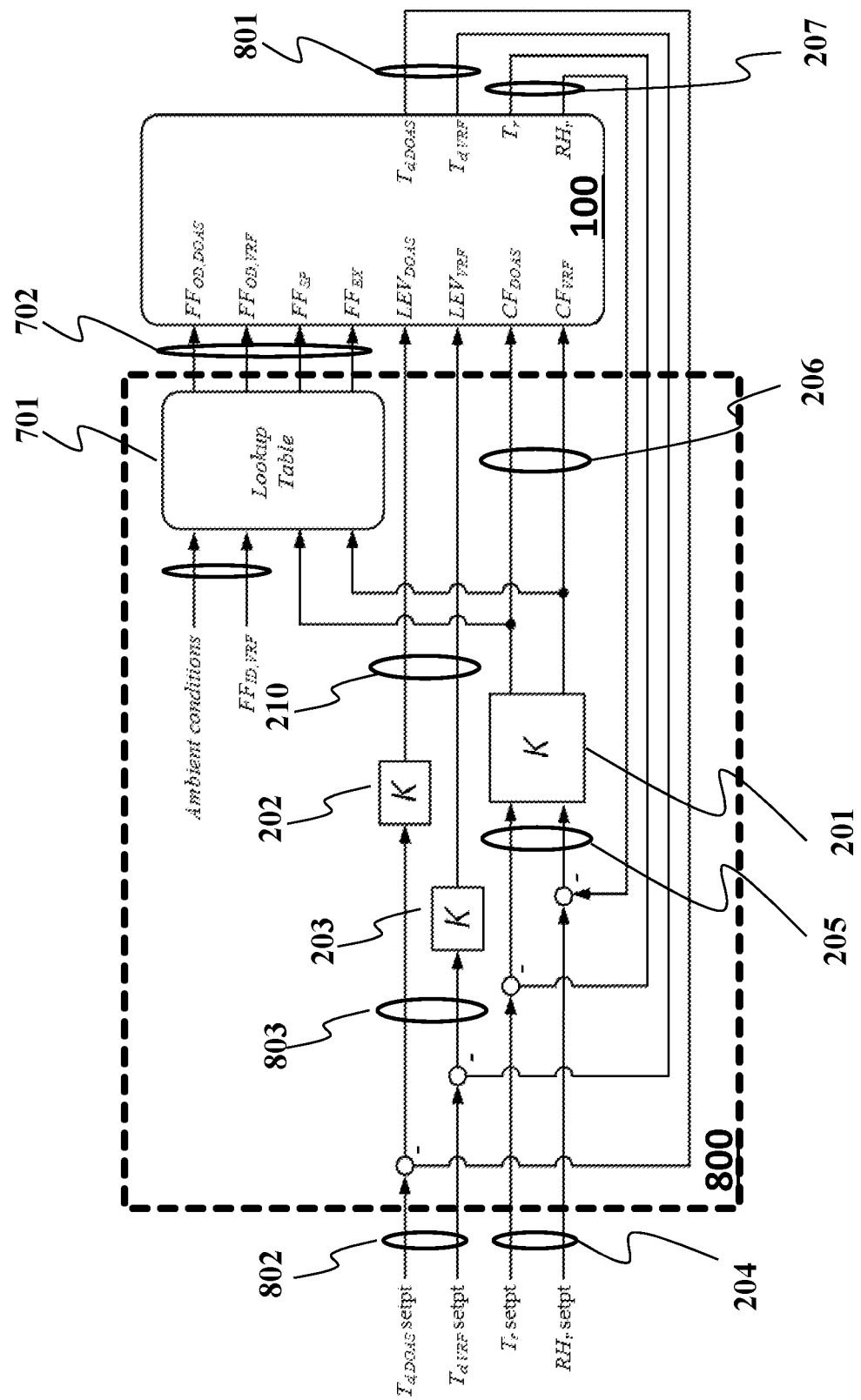

FIG. 8 shows another embodiment of a controller 800 controlling indirectly coupled air-conditioning systems. In this embodiment, decoupled control loops are used to regulate the expansion valve positions so that the compressor discharge temperatures 801 meet their setpoints 802. This controller architecture is similar to that proposed in FIG. 7, but the expansion valves are used to control the compressor discharge temperature values, rather than the evaporator superheat values.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated electrical circuits, with one or more processors in an integrated circuit component. Though, a processor may be implemented using electrical circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A controller for controlling at least a first air-conditioning system and a second air-conditioning system arranged for conditioning a common space, wherein a refrigerant circuit of the first air-conditioning system is separate from a refrigerant circuit of the second air-conditioning system, comprising:
    a multi-variable regulator to receive one or more setpoint signals and one or more measured value signals from the common space to determine control signals for controlling operations of first components of the first and the second refrigerant circuits to jointly and concurrently reduce at least one environmental error between the setpoint signals and the measured value signals;
    a first single-variable regulator to receive a first setpoint signal and a measured value signal of the operation of a second component of the first air-conditioning system and to determine a control signal for controlling the operation of the second component of the first air-conditioning system that reduces a first operational error of the second component of the first air-conditioning system;
    a second single-variable regulator to receive a second setpoint signal and a measured value signal of the operation of a second component of the second air-conditioning system and to determine a control signal for controlling the operation of the second component of the second air-conditioning system that reduces a second operational error of the second component of the second air-conditioning system;
    a memory storing a lookup structure mapping control signals controlling operations of a third component of the first air-conditioning system and a third component of the second air-conditioning system as a function of the control signals controlling operations of the first components of the first and the second air-conditioning systems;
    a processor to determine the control signals controlling operations of the third components of the first and the second air-conditioning systems by selecting the control signals from the lookup structure according to the control signals determined by the multi-variable regulator; and
    an electrical circuit for controlling the first and the second air-conditioning systems according to the determined control signals.

2. The controller of claim 1, wherein the first components include compressors of the first and the second air-conditioning systems, and the multi-variable regulator outputs speeds of the compressors, such that the first and the second refrigerant circuits operated by the compressors running with the outputted speeds jointly reduce the environmental error.

3. The controller of claim 2, wherein the values of the environment in the common space include one or combination of values of temperature and humidity in the common space, such that the speeds of compressors of the first and the second air-conditioning systems are jointly determined to reduce the environmental error including an error between setpoint values of temperature and humidity in the common space and measured values of the temperature and the humidity in the common space.

4. The controller of claim 1, wherein the second components of the first and the second refrigerant circuits are valves,
    wherein the first single-variable regulator determines an opening of a valve of the first air-conditioning system that reduces an error between a target suction superheat of the first air-conditioning system and a current suction superheat of the first air-conditioning system; and
    wherein the second single-variable regulator determines an opening of a valve of the second air-conditioning system that reduces an error between a target suction superheat of the second air-conditioning system and a current suction superheat of the second air-conditioning system.

5. The controller of claim 1, further comprising:
    a set of sensor for determining one or combination of signals indicative of measurements of environment in the common space and measurements of operations of the first and the second air-conditioning systems; and
    a set of couplers for combining the signals with corresponding target values of the environment and the operations of the first and the second air-conditioning systems to produce the environmental error and the first and the second operational errors.

6. The controller of claim 1, wherein the lookup structure is determined based on a model of the first and the second air-conditioning systems.

7. The controller of claim 6, wherein the processor optimizes the operations of third components of the first and the second air-conditioning systems for the operations of the first components of the first and the second air-conditioning systems using the model of the first and the second air-conditioning systems.

8. The controller of claim 7, wherein the control signals for the third components are predetermined to optimize total energy efficiency of the first and the second air-conditioning systems having the first components controlled with the control signals determined by the multi-variable regulator.

9. The controller of claim 7, wherein the first components of the first and the second air-conditioning systems include a compressor of the first air-conditioning system and a compressor of the second air-conditioning system, wherein the third components of the first and the second air-conditioning systems include a fan in the first air-conditioning system and a fan in the second air-conditioning system, and wherein the processor selects from the memory values of the speed of the fans in the first and the second air-conditioning systems optimizing total energy efficiency of the first and the second air-conditioning systems operating according to the values of the speed of the compressors in the first and the second air-conditioning systems.

10. The controller of claim 9, wherein the second components of the first and the second refrigerant circuits are valves, wherein the first single-variable regulator determines an opening of a valve of the first air-conditioning system that reduces an error between a target suction superheat of the first air-conditioning system and a current suction superheat of the first air-conditioning system; wherein the second single-variable regulator determines an opening of a valve of the second air-conditioning system that reduces an error between a target suction superheat of the second air-conditioning system and a current suction superheat of the second air-conditioning system; and wherein the processor selects from the memory a value of the target suction superheat of the first air-conditioning system and a value of the target suction superheat of the second air-conditioning system based on the values of the speed of the compressors in the first and the second air-conditioning systems.

11. The controller of claim 1, wherein the first air-conditioning system is a dedicated outdoor air system (DOAS), and wherein the second air-conditioning system is a variable refrigerant flow (VRF) system.

12. The controller of claim 1, wherein the multi-variable regulator receives a signal indicative of the environmental error between the setpoint signals and the measured value signals.

13. A controller for controlling at least two air-conditioning systems including a first air-conditioning system and a second air-conditioning system arranged for conditioning a common space, wherein a refrigerant circuit of the first air-conditioning system is separate from a refrigerant circuit of the second air-conditioning system, comprising:
a multi-variable regulator to determine concurrently a first speed of a first compressor of the first air-conditioning system and a second speed of a second compressor of the second air-conditioning system that jointly reduce an error between setpoint values of temperature and humidity in the common space and measured values of the temperature and the humidity in the common space;
a first single-variable regulator to determine a first opening of a first valve of the first air-conditioning system that reduces an error between a target suction superheat of the first air-conditioning system and a current suction superheat of the first air-conditioning system;
a second single-variable regulator to determine a second opening of a second valve of the second air-conditioning system that reduces an error between a target suction superheat of the second air-conditioning system and a current suction superheat of the second air-conditioning system, wherein the first opening of the first valve is determined independently from the second opening of the second valve;
a memory storing a lookup structure mapping values of the speed of the compressors in the first and the second air-conditioning systems to values of speed of fans in the first and the second air-conditioning systems optimizing total energy efficiency of the first and the second air-conditioning systems operating according to the corresponding values of the speed of the compressors in the first and the second air-conditioning systems
a processor to select a first fan speed of a first fan of the first air-conditioning system and a second fan speed of a second fan of the second air-conditioning system from the lookup structure using the first and the second speeds of the first and the second compressors; and
an electrical circuit to control the first compressor to have the first speed, the second compressor to have the second speed, the first valve to have the first opening, the second valve to have the second opening, the first fan to have the first fan speed, and the second fan to have the second fan speed.

14. The controller of claim 13, further comprising:
a processor to determine the first and the second opening of the first and the second valves based on a function of the first and the second speeds of the first and the second compressors.

15. The controller of claim 13, further comprising:
a processor to determine the target suction superheat of the first air-conditioning system and the target suction superheat of the second air-conditioning system based on a function of the first and the second speeds of the first and the second compressors.

16. The controller of claim 13, wherein the multi-variable regulator includes one or a combination of controllers computed as linear quadratic regulators or via H-infinity synthesis methods.

17. A method for controlling at least two air-conditioning systems including a first air-conditioning system and a second air-conditioning system arranged for conditioning a common space, wherein a refrigerant circuit of the first air-conditioning system is separate from a refrigerant circuit of the second air-conditioning system, comprising:
determining, using a multi-variable regulator, control signals for controlling operations of first components of the first and the second refrigerant circuits to jointly and concurrently reduce the environmental error between a setpoint and a measured value from a common space;
determining, using a first single-variable regulator, a control signal for controlling an operation of a second component of the first refrigerant circuit that reduces a first operational error between a first setpoint and a measured value of the operation of the second component of the second air-conditioning system;
determining, using a second single-variable regulator, a control signal for controlling an operation of a second component of the second refrigerant circuit that reduce a second operational error between a second setpoint and a measured value of the operation of the second component of the second air-conditioning system;
determining, using a processor operatively connected to a memory storing a lookup structure mapping control signals controlling operations of a third component of the first air-conditioning system and a third component of the second air-conditioning system as a function of the control signals controlling operations of the first components of the first and the second air-conditioning systems, control signals controlling operations of the third components of the first and the second air-conditioning systems by selecting the control signals from the lookup structure according to the control signals determined by the multi-variable regulator; and
controlling, using an electrical circuit, the first and the second air-conditioning systems according to the determined control signals.

18. The method of claim 17, wherein the first components of the first and the second air-conditioning systems include is a compressor of the first air-conditioning system and a compressor of the second air-conditioning system, wherein the second components of the first and the second refrigerant circuits include a valve of the first air-conditioning system and a valve of the second air-conditioning system, further comprising:
- determining values of the speed of the compressors in the first and the second air-conditioning systems, such that joint and concurrent operation of the first and the second air-conditioning systems according to the determined speeds of the compressor reduces the environmental error;
- determining a value of the target suction superheat of the first air-conditioning system and a value of the target suction superheat of the second air-conditioning system based on the values of the speed of the compressors in the first and the second air-conditioning systems;
- determining an opening of a valve of the first air-conditioning system that reduces an error between the target suction superheat of the first air-conditioning system and a current suction superheat of the first air-conditioning system; and
- determining an opening of a valve of the second air-conditioning system that reduces an error between the target suction superheat of the second air-conditioning system and a current suction superheat of the second air-conditioning system.

19. The method of claim 17, wherein the first components of the first and the second air-conditioning systems include is a compressor of the first air-conditioning system and a compressor of the second air-conditioning system, wherein the third components of the first and the second air-conditioning systems include a fan in the first air-conditioning system and a fan in the second air-conditioning system, further comprising:
- determining values of the speed of the compressors in the first and the second air-conditioning systems, such that joint and concurrent operation of the first and the second air-conditioning systems according to the determined speeds of the compressor reduces the environmental error; and
- determining values of the speed of the fans in the first and the second air-conditioning systems optimizing total energy efficiency of the first and the second air-conditioning systems operating according to the values of the speed of the compressors in the first and the second air-conditioning systems.

* * * * *